United States Patent [19]

Bopp

[11] E Re. 30,608

[45] Reissued May 12, 1981

[54] TEMPERATURE RESPONSIVE COUPLING

[75] Inventor: Warren G. Bopp, Farmington Hills, Mich.

[73] Assignee: Eaton Corporation, Cleveland, Ohio

[21] Appl. No.: 849,193

[22] Filed: Nov. 7, 1977

Related U.S. Patent Documents

Reissue of:

[64] Patent No.: 3,972,399
Issued: Aug. 3, 1976
Appl. No.: 528,187
Filed: Nov. 29, 1974

[51] Int. Cl.[2] ..... F16D 35/00; F16D 43/25

[52] U.S. Cl. ..... 192/58 B; 192/82 T

[58] Field of Search ..... 192/58 B, 82 T, 58 A

[56] References Cited

U.S. PATENT DOCUMENTS

| | | | |
|---|---|---|---|
| 3,257,808 | 6/1966 | Kuiper | 192/58 A X |
| 3,273,850 | 9/1966 | Kolze | 251/11 |
| 3,323,623 | 6/1967 | Roper | 192/58 B |
| 3,404,832 | 10/1968 | Sutaruk | 192/58 B X |
| 3,648,811 | 3/1972 | LaFlame | 192/82 T X |
| 3,727,735 | 4/1973 | LaFlame | 192/58 B |
| 3,739,891 | 6/1973 | LaFlame | 192/82 T |
| 3,809,197 | 5/1974 | Clancey | 192/58 B |
| 3,840,101 | 10/1974 | Peter et al. | 192/58 B |

*Primary Examiner*—Allan D. Herrmann
*Attorney, Agent, or Firm*—R. J. McCloskey; D. Wood; P. Rulon

[57] ABSTRACT

A temperature controlled fluid shear coupling adapted to drive a fan for an internal combustion engine. The coupling includes a driven member defining a housing adapted to carry the fan, a drive member adapted to be driven by the engine, a working chamber defined by the driven and drive member and containing viscous fluid, a pump for removing fluid from the working chamber to a reservoir, and temperature control assembly which varies the volume of fluid in the working chamber by controlling fluid flow from the reservoir to the working chamber in response to temperature changes. The temperature control includes a wax filled power element and a valving member. The valving member blocks fluid flow from the reservoir to the working chamber when the wax is solid and allows flow to the working chamber when the wax is a liquid.

7 Claims, 3 Drawing Figures

TEMPERATURE RESPONSIVE COUPLING

Matter enclosed in heavy brackets [ ] appears in the original patent but forms no part of this reissue specification; matter printed in italics indicates the additions made by reissue.

FIELD OF THE INVENTION

This invention relates generally to torque control of fluid shear couplings and specifically to control of torque by controlling fluid level in such devices.

DESCRIPTION OF THE PRIOR ART

Fluid shear couplings are well known in the prior art. These couplings employ fluid shear stress to transmit torque between two relatively rotatable input and output members. The torque transmitting capacity of such couplings may be controlled in many ways. Torque control by varying the inventory of the fluid between the input and output members seems to be the most successful. Many couplings with inventory control employ a bimetallic spring, which is operative to position a valve element or pump element in response to temperature changes ambient to the spring. If the coupling is to be controlled in response to ambient temperatures exterior of the coupling, the spring, by necessity, is positioned on the coupling exterior. When so positioned, the spring must also move an intermediate mechanism that passes through the wall of the coupling.

Exterior positioning of the spring, while necessary, creates some control problems. Control forces, provided by the bimetallic spring per degree temperature change of the spring, are low and at best marginal for moving the intermediate mechanism and the valve or pump element. Since the control forces are low, the spring is sensitive to centrifugal forces generated by rotation of the coupling. The spring is traditionally positioned coincident the rotation axis of the coupling to neutralize the centrifugal forces. However, there is more air flow at the radial extremities of the coupling and positioning of the spring at an extremity would provide better temperature response. Further, even with the spring positioned at the rotational axis, control may be lost if the intermediate mechanism sticks at the point where it passes through the wall of the coupling.

SUMMARY OF THE INVENTION

An object of this invention is to provide superior torque control for a fluid coupling.

A more specific object of this invention is to provide a fluid coupling having a temperature responsive torque regulating means which is insensitive to centrifugal forces generated by rotation of the coupling.

Another object of this invention is to provide a fluid coupling having a temperature responsive torque regulating means which is positioned to provide improved temperature response.

The fluid coupling of this invention is of the type including two relatively rotatable members which define a fluid working chamber; torque is transmitted from one member to the other by fluid shear stress when relative rotation occurs between the members; and the amount of torque transmitted is controlled by varying the fluid inventory in the working chamber.

According to an important feature of this invention a temperature responsive device having a liquid-solid phase change substance controls the fluid inventory in response to a phase change of the substance over a predetermined temperature range. The use of a liquid-solid phase change substance as a control media provides very substantial forces per degree temperature change and hence, provides positive operation of the control mechanism.

According to another important feature of this invention a temperature responsive device, in thermal communication with the ambient exterior of the coupling, is radially disposed with respect to the rotational axis of the coupling. This arrangement positions the temperature responsive device in an area having an increased air flow and hence, improves temperature response of the device.

BRIEF DESCRIPTION OF THE DRAWINGS

A preferred embodiment of the invention is shown in the accompanying drawings in which.

DESCRIPTION OF THE PREFERRED EMBODIMENT

Figure 1:
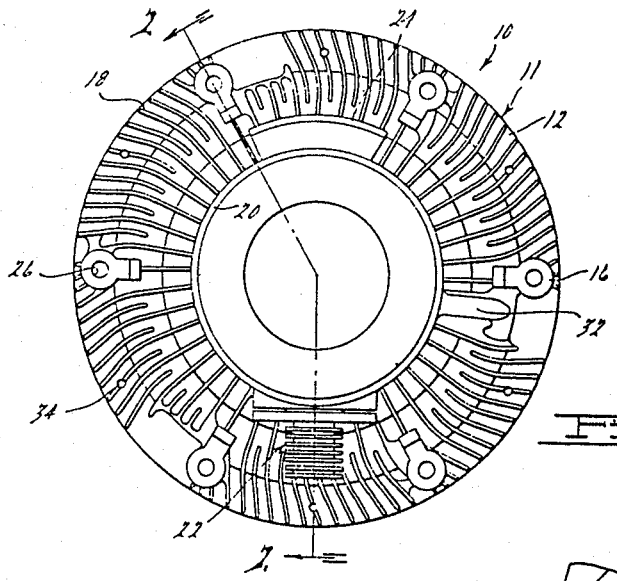
FIG. 1 is a front elevational view of the coupling.
Figure 2:
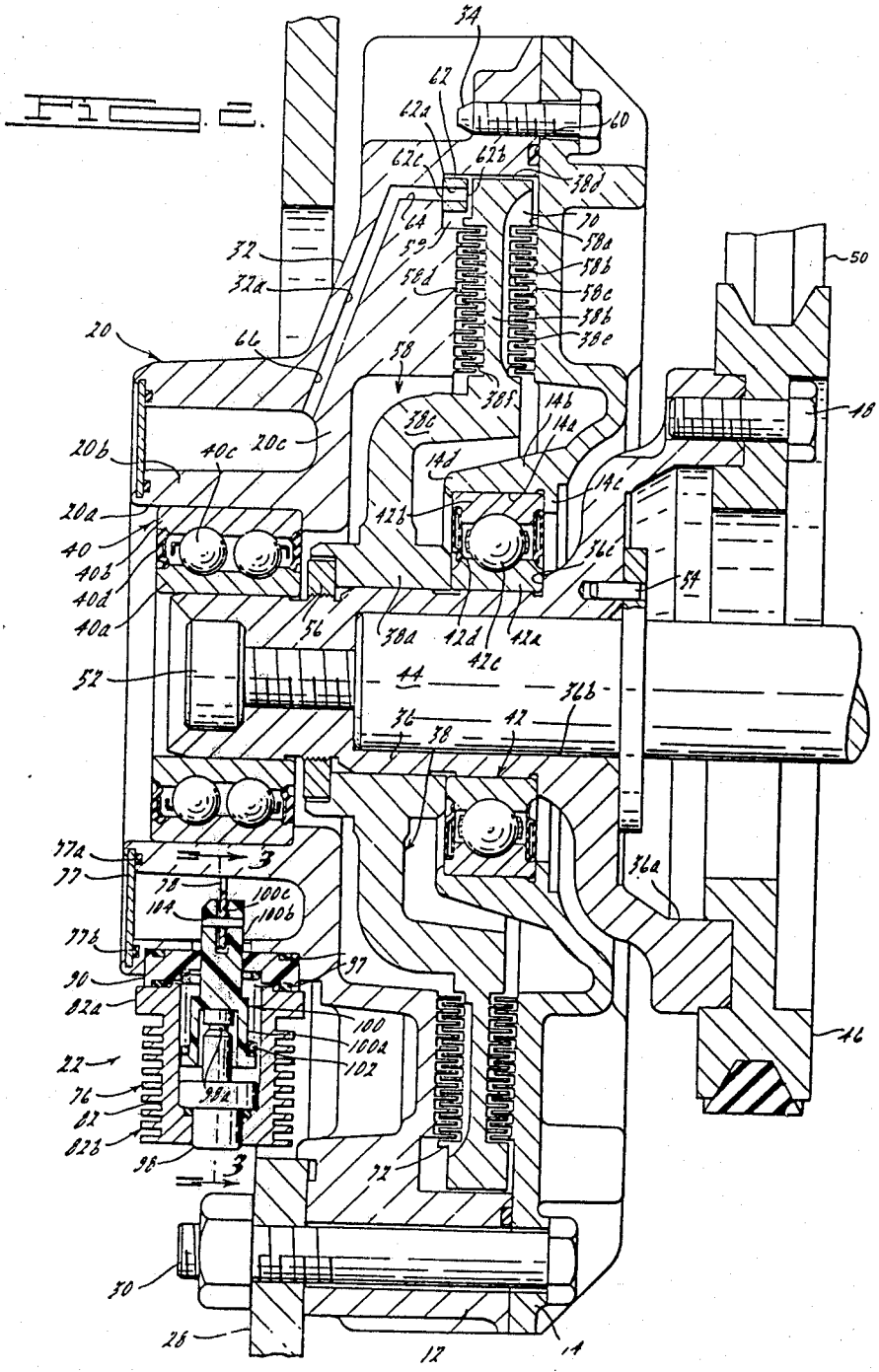
FIG. 2 is an enlarged sectional view of the coupling in FIG. 1, looking in the direction of arrows 2—2.

The present invention is embodied in a viscous fluid coupling 10, shown in elevation in FIG. 1. The coupling is adapted to be driven by a liquid cooled engine and in turn drive a cooling fan for removing heat from the engine coolant. The coupling includes a cast metal housing 11 consisting of a front housing member 12 (shown in FIGS. 1 and 2) and a rear housing member 14 (shown in FIG. 2). The front housing member is integrally formed with six radially disposed bosses 16, a plurality of cooling fins 18, and an annular reservoir 20. The reservoir projects axially outward from housing member 12 and has secured thereto a temperature control assembly 22 and a weight 24 to counterbalance the weight of assembly 22. Bosses 16 are machined and drilled with through holes 26 for securing a fan not shown in FIG. 1 to the housing. A ring 28, from which the fan blades radiate, is partially shown in FIG. 2. The ring is secured to the housing by six bolt and nut sets 30, one set of which is shown in FIG. 2. A raised portion 32, cast into housing member 12 contains a drilled passage 32a for communicating a fluid to the reservoir from a working chamber within the housing 11. Passage 32a is shown only in FIG. 2. For purposes of clarity, raised portion 32 in FIG. 2 is shown out of position with respect to the position shown in FIG. 1.

The front and rear housing members are secured together by bolt and nut sets 30 and six screws 34 which are circumferentially spaced between bolt and nut sets 30. The ends of screws 34 are visable in FIG. 1. One of the screws is shown in FIG. 2. Nut and bolt set 30 and screw 34 are shown out of position with respect to their positions shown in FIG. 1.

Referring now to FIG. 2, the coupling per se may be divided into four assemblies; a driving assembly which includes a shaft 36 and a drive member 38, a driven assembly which includes housing members 12 and 14, a bearing assembly which includes a front ball bearing 40 and a rear ball bearing 42 for journaling the housing members on shaft 36, and temperature control assembly 22.

Shaft 36 of the driving assembly includes a flange portion 36a and a stepped bore portion 36b. Shaft 36 may be supported and rotated in any manner desired. Herein, support is provided by a shaft 44 and rotation by a pulley 46. Shaft 44 is pressed into stepped bore portion 36b. Shaft 44 is rotationally supported by an unshown hanger bracket which is adapted to be fixed to an engine. Shaft 44 is further secured from axial and rotational movement relative to shaft 36 by a cap screw 52 and a pin 54. Pulley 46 is secured to flange portion 36a by a plurality of bolts 48, one of which is shown. Pulley 46 is driven by a V-belt 50.

Driven member 38 includes hub portion 38a, an annular ring or rim portion 38b, and a plurality of L-shaped spokes 38c which secure the rim and hub together. Annular rim portion 38b includes a smooth walled portion 38d at its outer extent and a ribbed walled portion defined by a plurality radially spaced, concentric rings 38e and 38f which project axially from both sides of the rim.

Housing members 12 and 14 of the driven assembly are rotationally supported on shaft 36 by the bearings 40 and 42 of the bearing assembly. Rear ball bearing 42 includes an inner race 42a, an outer race 42b, and a row of ball bearings 42c which are protected by a pair of seals 42d. Inner race 42a is pressed on shaft 36 and secured from axial movement by a shoulder 36c formed on the shaft, and hub portion 38a of the drive member 38. Hub portion 38a is pressed on shaft 36 and further secured from axial movement by a nut 56. Outer race 42b is pressed into a bore 14a defined by an axially extending annular flange portion 14b of housing member 14. The outer race is further secured from axial movement by a shoulder portion 14c and metal rolling of the flange portion 14b, as at 14d.

Bearing assembly 40 includes an inner race 40a, an outer race 40b, and a double row of ball bearings 40c which are protected by a pair of seals 40d. Outer race 40b is pressed into a shouldered bore 20a defined by the inner diameter of an inner annular wall portion 20b of reservoir 20. Inner race 40a is slide fitted on shaft 36.

Housing members 12 and 14 of the driven assembly define an annular cavity 58 having disposed therein drive member 38. Cavity 58 is sealed at its radially outer extent by an annular seal 60 and at its radially inner extent by seals 40d and 42d. Cavity 58 includes a smooth walled portion 58a at its radially outer extent and a ribbed walled portion 58b which is disposed radially inward and adjacent the smooth walled portion. The ribs of ribbed walled portion 58b are defined by a plurality of radially spaced, concentric rings 58c and 58d. Rings 58c and 58d project axially into the spaces defined by radially spaced, concentric rings 38e and 38f, respectively.

The smooth and ribbed walled portions of rim 38 and cavity 58 are spaced apart to define a fluid working chamber 59 which contains a variable inventory of viscous fluid such as silicone fluid. The viscous fluid transmits rotational forces from drive member 38 to housing members 12 and 14 via fluid shear stress whenever a rotational speed difference exists between drive member 38 and housing members 12 and 14. The amount of rotational force transmitted is a function of many variables. Herein, only rotational speed differences and fluid level in the working chamber are of concern. The amount of rotational force transmitted is directly proportional to the speed difference and to the fluid level in the working chamber.

A pump 62 is fixed to housing member 12 at the left end wall of smooth walled portion [58b] *58a*. A passage 62a in pump 62 provides means for passage of fluid through the pump. End 62b of passage 62a is the pump inlet and end 62c is the pump outlet. Pump 62 is connected at its outlet to reservoir 20 via passages 64, 32a and 66. Pump 62 provides a pumping pressure to remove fluid from working chamber 59 to reservoir 20 whenever driven member 38 rotates faster than housing member 12. Pump 62 is a ramp type pump; such pumps are well known in the art. Particulars concerning the structure and operation of ramp pumps may be found in U.S. Pat. No. 3,268,041. Fluid flow from reservoir 20 to working chamber 59 is provided by an arcuate passage 68 formed in the right end wall 20c of reservoir 20. Arcuate passage 68, which is shown only in FIG. 3, opens into the radially inner part of cavity 58. Spaces between spokes 38c of drive member 38 allow fluid flow to both sides of working chamber 59. Fluid flow, radially outward, through the labyrinth defined by the ribbed walls of working chamber 59 is enhanced by a plurality of radially extending, V-shaped grooves 70 and 72 formed into both faces of rim portion 38b.

When drive member 38 is driving housing members 12 and 14, pump 62 will continuously pump fluid from working chamber 59 to reservoir 20 until the fluid level falls below inlet 62b. The fluid level in working chamber 59 may be controlled between a minimum level, as determined by the position of passage 62b, and a maximum level by controlling the opening of arcuate passage 68. Temperature control assembly 22 controls the amount of opening of arcuate passage 68 in response to ambient air temperature changes exterior of the coupling housing, thereby controlling the amount of driving torque to housing members 12 and 14.

Figure 3:
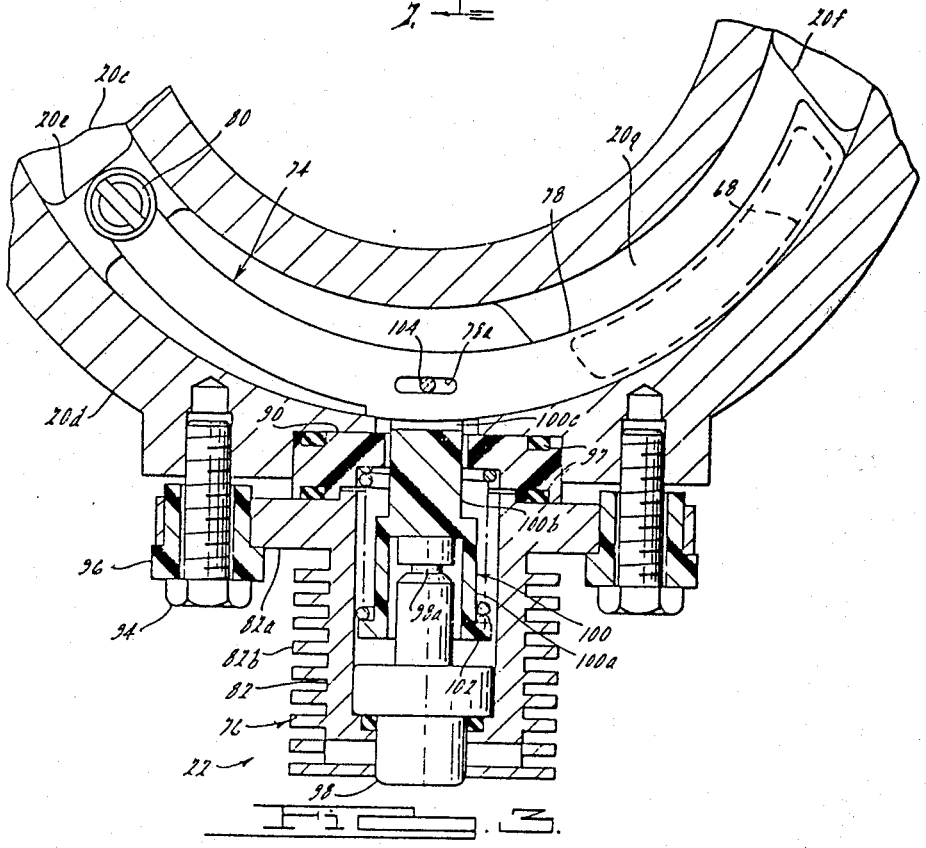
FIG. 3 is a fragmentary, sectional view of a control assembly in FIG. 2, looking in the direction of arrows 3—3.

Referring now to FIGS. 2 and 3, the temperature control assembly includes a valve assembly 74 disposed in annular reservoir 20 and a temperature sensing assembly 76 mounted on an annular wall portion 20d of reservoir 20. Annular reservoir 20 is defined by wall portions 20b, 20c, 20d and an annular plate 77 which is secured to wall portions 20b and 20d by metal rolling. The mating surfaces of walls 20b, 20d and plate 77 are sealed by annular seals 77a and 77b. Valve assembly 74 includes an arcuate valving member 78, a mounting boss 20e which protrudes from end wall 20c of the reservoir, a pin assembly 80 for pivotally securing member 78 to boss 20e, a valve boss 20f which protrudes from end wall 20c, and a slotted opening 78a for connecting the member 78 to temperature sensing assembly 76. Bosses 20e and 20f are not visible in FIG. 2. The front face of boss 20f has a smooth flat face 20g which provides a sliding-sealing interface with arcuate valving member 78. Arcuate passage 68 extends through boss 20f and end wall 20c. Passage 68 is sealed from communication with reservoir 20, when valving member 78 is in the position shown in FIG. 3.

Temperature sensing assembly 76 includes a cup-shaped housing 82 having a radially extending flange portion 82a and heat transfer fins 82b. Housing 82 is seated on a thermal insulating, annular ring 90 and is secured to wall portion 20d by a plurality of screws 94 which are thermally insulated from flange portion 82a by collars 96. A pair of annular seals 97 prevent fluid leakage from reservoir 20 and the interior of housing 82. Temperature sensing assembly 76 also includes a wax filled power element 98, a thermal insulating piston 100, and a helical spring 102 for biasing piston 100 toward element 98. Piston 100 has a cup-shaped portion 100a which embraces one end of element 98, a shaft portion 100b which passes through the inside diameter of annular ring 90, and a forked end *100c* which receives valving member 78. A pin 104 slidably secures piston 100 to valving member 78. The annular space defined by the outside diameter of shaft portion 100b and the inside diameter of ring 90 allows enough fluid circulation between reservoir 20 and the interior of housing 82 to prevent a hydraulic lock when piston 100 moves.

Housing 82 and element 98 are thermally insulated from metal contact with the coupling housing so that element 98 may respond to ambient temperatures exterior of the coupling. The thermal insulating is not defeated by the silicone fluid in housing 82, since this fluid is relatively stagnant and has a low heat transfer coefficient. The ability of the element to respond to ambient temperature exterior of the coupling is further enhanced by placing the temperature control radially outward of the rotational axis of the coupling and into a position allowing greater ambient air flow over the element.

Wax filled power elements are well known in the art of thermostatic valves for engine cooling systems. Element 98 is pressed into housing 82 to maximize heat transfer from the housing to the wax in the element. Element 98 includes a pushrod 98a which extends from the element into contact with piston 100. The wax in the element is selected to have a high coefficient of expansion at its liquid-solid phase change temperature. The wax volume increases when it liquifies and moves the pushrod outward from the element, thereby moving piston 100 and causing valving member 78 to pivotally move away from arcuate passage 68. The wax volume decreases when it solidifies and spring 102 moves the piston toward the element, thereby retracting the pushrod and also causing valving member 78 to pivotally move over arcuate passage 68. The wax in element 98 may have any liquid-solid temperature range desired, for this particular coupling we have selected a range of 155° F. to 165° F.

When the wax is a solid, at temperatures below 155° F., passage 68 is blocked by valving member 78. When passage 68 is blocked, the fluid inventory in working chamber 59 will tend toward a minimum level as determined by inlet passage 62b of pump 62. Hence, the position of passage 62b determines the minimum torque capacity of the coupling. When the wax is a liquid, at temperatures above 165° F., passage 68 is unblocked; this allows free circulation of the pumped fluid back to the working chamber, thereby maintaining the fluid inventory and the coupling torque capacity at maximum levels.

OPERATION

Operation of the disclosed coupling is believed to be apparent from the drawing and the preceding description. When the rotational speed of drive member 38 is greater than the rotational speed of housing 11, fluid is pumped from the working chamber to the reservoir by pump 62. When passage 68 is uncovered, the fluid freely returns to the working chamber, thereby maintaining the volume of the fluid inventory in the working chamber at a maximum and hence, allowing maximum torque transmission from drive member 38 to housing 11 by fluid shear stress. When passage member 68 is covered, the fluid is stored in the reservoir, thereby decreasing the volume of the fluid inventory in the working chamber to a minimum and hence, allowing a minimum torque transmission from drive member 38 to housing 11. Covering and uncovering of passage 68 is controlled by temperature sensing assembly 76 and valving member 78 of temperature control assembly 22. When the wax in element 98 is a solid, valving member 78 is moved to a position covering passage 68. When the wax is a liquid, valving member 78 is moved to a position uncovering passage 68.

The preferred embodiment of the invention has been disclosed for illustrative purposes. The following claims are intended to cover the inventive portion of the preferred embodiment and variations of modifications within the spirit of the invention.

I claim:

[1. A viscous fluid coupling comprising:

first and second relatively rotatable members mounted about a common axis;

a working chamber defined by said members and containing an inventory of viscous fluid for transmitting torque from one of said members to the other of said members by fluid shear stress in response to relative rotation of said members;

a fluid reservoir;

first and second passage means for communicating said working chamber with said reservoir;

means for pumping fluid from said working chamber to said reservoir via one of said passages;

valve means associated with one of said passages and movable between a first position blocking fluid flow in one of said passages and a second position allowing fluid flow in said one passage; and temperature sensing means mounted on one of said members at a position radially disposed with respect to said common axis and including means containing a liquid-solid phase change substance having a high coefficient of expansion during phase change and operative to move said valve means between said first and second positions in response to said phase change occurring over a predetermined temperature range.]

[2. The coupling of claim 1, wherein:

said first member defines a housing having an interior containing said second member and an exterior;

said reservoir is defined by said housing, and said temperature sensing means is mounted on said first member and is responsive to ambient temperature exterior of said housing.]

[3. A viscous coupling comprising:

a first rotatable member defining a housing rotatable about an axis;

a second member disposed in the interior of said housing and rotatable about said axis;

a working chamber defined by said members and containing an inventory of viscous fluid for transmitting torque from one of said members to the other of said members by fluid shear stress in response to relative rotation of said members;

an annular reservoir defined by said first member and the outer diameter of said reservoir being defined by an annular wall portion projecting axially outward from said housing;

first and second passage means for communicating said working chamber with said reservoir;

means for pumping fluid from said working chamber to said reservoir via said first passage;

valve means associated with said second passage and moveable between a first position blocking fluid flow from said reservoir to said working chamber via said second passage and a second position allowing fluid flow from said reservoir to said working chamber via said second passage.

temperature sensing means for sensing temperature changes exterior of said coupling and mounted on said annular wall portion, said sensing means including means containing a liquid-solid phase change substance having a high coefficient of expansion during phase change and operative to move said valve means between said first and second positions in response to said phase change occurring over a predetermined temperature range.]

[4. The coupling of claim 3, wherein:

said valve means includes an arcuate valve member having one end pivotally connected to said housing and the other end covering said second passage when said valve means is in said first position and said temperature sensing means includes a piston connecting said phase change substance with said arcuate valve member and operative to pivotally move said valve member to said second position in response to said substance changing from a solid to a liquid.]

5. The coupling of claim [4,] *19* wherein:

said valve means includes resilient means for moving said valve member from said second position to said first position in response to said substance changing from a liquid to a solid.

[6. A viscous fluid coupling comprising:

a first rotatable member defining a housing rotatable about an axis;

a second member disposed in the interior of said housing and rotatable about said axis;

a working chamber defined by said members and containing an inventory of viscous fluid for transmitting torque from one of said members to the other of said members by fluid shear stress in response to relative rotation between said members;

a reservoir defined by said housing;

first and second passage means for communicating said working chamber with said reservoir;

means for pumping fluid from said working chamber to said reservoir via said first passage;

means for communicating fluid from said reservoir to said working chamber via said second passage means;

valve means associated with said second passage and moveable between a first position blocking fluid communication from said reservoir to said working chamber; and temperature sensing means radially disposed with respect to said axis and mounted on the exterior of said housing, said sensing means including means containing a liquid-solid phase change substance:

1. having a high coefficient of expansion during phase change,
2. responsive to changes in temperature ambient to the exterior of said housing, and
3. operative to move said valve means from said first position to said second position in response to said substance changing from a solid to a liquid over predetermined temperature range of said ambient temperature.]

[7. The coupling of claim 6, wherein:

said containing means is a wax filled power element.]

[8. A viscous fluid coupling comprising:

a first rotatable member defining a housing rotatable about an axis;

a second member disposed in the interior of said housing and rotatable about said axis;

a working chamber defined by said members and containing an inventory of viscous fluid for transmitting torque from one of said members to the other of said members by fluid shear stress in response to relative rotation between said members;

an annular reservoir defined by said housing and having an outer wall portion exposed to the exterior of said housing;

means for varying the volume of said fluid inventory in said working chamber, said means including means moveable between a first position for reducing said volume to a minimum amount and a second position for increasing said volume to a maximum amount;

temperature sensing means radially disposed with respect to said axis and mounted on the outer wall portion exposed to the exterior of said housing and including means operative to move between said first and second positions in response to changes in temperature ambient to the exterior of said housing.]

[9. The coupling of claim 8, wherein said moveable means includes:

means for pumping fluid from said working chamber to said reservoir;

means for returning fluid to said reservoir;

an arcuate valving member pivotly disposed in said annular reservoir, and connected to said operative means, said valving member operative to block fluid return to said working chamber via said returning means when said operative means is in said first position and allow fluid return to said working chamber via said returning means when said operative means is in said second position.]

[10. A fluid coupling comprising:

first and second relatively rotatable members mounted about a common axis and defining a working chamber containing an inventory of fluid for transmitting torque from one member to the other member in response to relative rotation between said members;

a fluid reservoir defined by one of said members;

first and second passage means for communicating said working chamber with said reservoir;

means for pumping fluid from said working chamber to said reservoir via one of said passages;

valve means associated with one of said passages and moveable between a first position blocking fluid flow in the associated passage and a second position allowing fluid flow in the associated passage; and temperature sensing means mounted on one of said members at a position disposed radially outward of said rotational axis and on the exterior of said coupling, said sensing means operative to move said valve means between said first and second positions in response to sensed temperature changes occurring exterior of said coupling.]

[11. The fluid coupling of claim 10, wherein said sensing means includes:

means operative to produce forces of a magnitude substantially uneffected by rotational forces acting on said valve means;]

[12. The fluid coupling of claim 10, wherein said sensing means includes:

means containing a phase change substance having a high thermal coefficient of expansion and operative to move said valve means in response to said sensed temperature changes causing a phase change of said substance.]

[13. The coupling of claim 12, wherein said first member defines a housing having an interior containing said second member and an exterior, said reservoir is defined by said housing, said containing means of said temperature sensing means is mounted on the exterior of said housing, and wherein said sensing means further includes:

means connecting said containing means with said valve means and operative to move said valve means to said second position in response to an increase in said sensed temperature causing a phase change of said substance.]

[14. The coupling of claim 13, wherein said temperature sensing means further includes:

spring means biasing said connecting means toward said containing means and operative to move said valve means to said first position in response to a decrease in said sensed temperature causing a phase change of said substance.]

[15. The coupling of claim 14, wherein said substance is a liquid-solid phase change substance.]

[16. The coupling of claim 15, wherein said substance is a wax which changes to a liquid in response to increased temperatures.]

[17. The coupling of claim 14, wherein said containing means causes said substance to expand radially inward with respect to the rotational axis of said coupling, said connecting means moves radially inward with respect to said rotational axis in response to said substance expanding radially inward, and said spring means biases said connecting means radially outward with respect to said axis.]

[18. The coupling of claim 17, wherein said housing includes an annular wall portion projecting axially outward from said housing and defining an outer circumferential boundary of said reservoir and said temperature sensing means is mounted on said wall portion.]

*19. A viscous coupling comprising:*

*a first rotatable member defining a housing rotatable about an axis;*

*a second member disposed in the interior of said housing and rotatable about said axis;*

*a working chamber defined by said members and containing an inventory of viscous fluid for transmitting torque from one of said members to the other of said members by fluid shear stress in response to relative rotation of said members;*

*an annular reservoir defined by said first member and the outer diameter of said reservoir being defined by an annular wall portion projecting axially outward from said housing;*

*first and second passage means for communicating said working chamber with said reservoir;*

*means for pumping fluid from said working chamber to said reservoir via said first passage;*

*an arcuate valving member having one end pivotally connected to said housing and the other end associated with said second passage means, said valving member moveable between a first position wherein said other end covers said second passage means and blocks fluid flow from said reservoir to said working chamber and a second position wherein said other end uncovers said second passage means and allows fluid flow from said reservoir to said working chamber; and*

*temperature sensing means for sensing temperature changes exterior of said coupling and mounted on said annular wall portion, said sensing means including means containing a liquid-solid phase change substance having a high coefficient of expansion during phase change and operative to move said valving member between said first and second positions in response to said phase change occurring over a predetermined temperature range, and said sensing means including a piston connecting said phase change substance with said arcuate valving member and operative to pivotally move said valving member to said second position in response to said substance changing from a solid to a liquid.*

*20. A viscous fluid coupling comprising:*

*a first rotatable member defining a housing rotatable about an axis;*

*a second member disposed in the interior of said housing and rotatable about said axis;*

*a working chamber defined by said member and containing an inventory of viscous fluid for transmitting torque from one of said members to the other of said members by fluid shear stress in response to relative rotation between said members;*

*an annular reservoir defined by said housing and having an outer wall portion exposed to the exterior of said housing;*

*means for pumping fluid from said working chamber to said reservoir;*

*means for returning fluid to said reservoir;*

*temperature sensing means radially disposed with respect to said axis and mounted on the outer wall portion exposed to the exterior of said housing and including means operative to move between first and second positions in response to changes in temperature ambient to the exterior of said housing;*

*means thermally insulating said temperature sensing means from said outer wall portion; and*

*an arcuate valving member pivotally disposed in said annular reservoir and connected to said operative means, said valving member operative to block fluid return to said working chamber via said returning means when said operative means is in said first position and allow fluid return to said working chamber via said returning means when said operative means is in said second position.*

*21. A viscous fluid coupling comprising:*

*first and second relatively rotatable members mounted about a common axis;*

*a working chamber defined by said members and containing an inventory of viscous fluid for transmitting torque from one of said members to the other of said members by fluid shear stress in response to relative rotation of said members;*

*a fluid reservoir;*

*first and second passage means for communicating said working chamber with said reservoir;*

*means for pumping fluid from said working chamber to said reservoir via one of said passages;*

*valve means associated with one of said passages and moveable between a first position blocking fluid flow in one of said passage means and a second position allowing fluid flow in said one passage means;*

*temperature sensing means mounted on one of said members and responsive to temperature changes exte-*

*rior to said coupling, said sensing means including means containing a liquid-solid phase change substance having a high coefficient of expansion during phase change and operative to move said valve means between said first and second positions in response to said phase change occurring over a predetermined temperature range; and*

*insulating means interposed between said sensing means and said one member for minimizing heat conduction between said sensing means and said one member.*

*22. A viscous fluid coupling comprising:*

*first and second relatively rotatable members mounted about a common axis;*

*a working chamber defined by said members and containing an inventory of viscous fluid for transmitting torque from one of said members to the other of said members by fluid shear stress in response to relative rotation of said members;*

*a fluid reservoir;*

*first and second passage means for communicating said working chamber with said reservoir;*

*means for pumping fluid from said working chamber to said reservoir via one of said passages;*

*valve means associated with one of said passages and moveable between a first position blocking fluid flow in one of said passage means and a second position allowing fluid flow in said one passage means;*

*temperature sensing means mounted on one of said members at a position radially disposed with respect to said common axis and responsive to temperature changes exterior to said coupling, said sensing means including means containing a liquid-solid phase change substance having a high coefficient of expansion during phase change and operative to move said valve means between said first and second positions in response to said phase change occurring over a predetermined temperature range; and*

*insulating means interposed between said sensing means and said one member for minimizing heat conduction between said sensing means and said one member.*

*23. A fluid coupling comprising:*

*first and second relatively rotatable members mounted about a common axis and defining a working chamber containing an inventory of fluid for transmitting torque from one member to the other member in response to relative rotation between said members;*

*a fluid reservoir defined by one of said members;*

*first and second passage means for communicating said working chamber with said reservoir;*

*means for pumping fluid from said working chamber to said reservoir via one of said passages;*

*temperature sensing means mounted on one of said members at a position disposed radially outward of said rotational axis and on the exterior of said coupling, said sensing means including means operative to move between first and second positions in response to changes in temperature ambient to the exterior of said coupling; and*

*an arcuate valving member pivotally connected to said one member in said reservoir and further connected to said operative means, said valving member operative to block fluid flow in one of said passages when said operative means is in said first position and allow fluid flow in said one passage when said operative means is in said second position.*

*24. A fluid coupling comprising:*

*first and second relatively rotatable members mounted about a common axis and defining a working chamber containing an inventory of fluid for transmitting torque from one member to the other member in response to relative rotation between said members;*

*a fluid reservoir defined by one of said members;*

*first and second passage means for communicating said working chamber with said reservoir;*

*means for pumping fluid from said working chamber to said reservoir via one of said passages;*

*temperature sensing means mounted on one of said members at a position disposed radially outward of said rotational axis and on the exterior of said coupling, said sensing means including means operative to move between first and second positions in response to changes in temperature ambient to the exterior of said coupling;*

*means thermally insulating said temperature sensing means from said one member; and*

*an arcuate valving member pivotally disposed in said reservoir and connected to said operative means, said valving member operative to block fluid flow in one of said passages when said operative means is in said first position and allow fluid flow in said one passage when said operative means is in said second position.*

* * * * *